US012619212B2

(12) United States Patent
Idris et al.

(10) Patent No.: US 12,619,212 B2
(45) Date of Patent: May 5, 2026

(54) REDUCING CO₂ PRODUCTION LEVELS IN A GAS OPERATION NETWORK USING A PREDICTIVE MODEL

(71) Applicant: Saudi Arabian Oil Company, Dhahran (SA)

(72) Inventors: Muhammad Idris, Udhailiyah (SA); Emad Abbad M. Alabbad, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 1050 days.

(21) Appl. No.: 17/650,479

(22) Filed: Feb. 9, 2022

(65) Prior Publication Data

US 2023/0251628 A1      Aug. 10, 2023

(51) Int. Cl.
G05B 19/4155          (2006.01)

(52) U.S. Cl.
CPC .................... G05B 19/4155 (2013.01); G05B 2219/41108 (2013.01)

(58) Field of Classification Search
None
See application file for complete search history.

(56) References Cited

U.S. PATENT DOCUMENTS

| | | |
|---|---|---|
| 6,101,447 A | 8/2000 | Poe, Jr. |
| 10,260,319 B2 | 4/2019 | Sarduy et al. |
| 12,044,818 B2 * | 7/2024 | Hall-Thompson ...... G06F 30/20 |

| | | | |
|---|---|---|---|
| 2011/0153103 A1 | 6/2011 | Brown et al. | |
| 2014/0172382 A1 * | 6/2014 | Andrews ................... | F17D 5/00 |
| | | | 703/2 |
| 2015/0004009 A1 | 1/2015 | Verma et al. | |
| 2017/0116359 A1 | 4/2017 | Jenneman et al. | |
| 2017/0242410 A1 * | 8/2017 | Iyer ........................ | E21B 49/00 |
| 2021/0182460 A1 * | 6/2021 | Yang ...................... | G06F 30/28 |
| 2022/0049580 A1 * | 2/2022 | Bremner ............. | E21B 49/0875 |

(Continued)

FOREIGN PATENT DOCUMENTS

| | | |
|---|---|---|
| EP | 3098511 B1 | 2/2020 |
| WO | WO 2022013064 A1 | 1/2022 |

OTHER PUBLICATIONS

SAIP Examination Report in Saudi Arabian Appln. No. 123441199, mailed on Aug. 25, 2025, 9 pages (with English translation).

*Primary Examiner* — Brian R Gordon
(74) *Attorney, Agent, or Firm* — Fish & Richardson P.C.

(57)          ABSTRACT

This specification relates to reducing CO2 levels of a gas operation network using a predictive model. The systems and methods described in this specification process an input data set that includes (i) gas flowrate data and (ii) CO2 concentration data. The systems and methods generate the predictive model by processing the input dataset. The systems and methods predict, by the predictive model, a CO2 production target for the gas operation network based on a gas flowrate predicted for each of the plurality of wells by the predictive model. The systems and methods generate control signals to control a respective valve at each well based on the CO2 production target and the predicted gas flowrate for each well. The systems and methods regulate CO2 levels of the gas operation network based on the CO2 production target by controlling the respective valves at each well.

20 Claims, 10 Drawing Sheets

(56)     References Cited

U.S. PATENT DOCUMENTS

| 2023/0071756 A1* | 3/2023 | Liu | G06Q 50/06 |
| 2023/0094640 A1* | 3/2023 | Shao | G05B 13/048 |
| | | | 137/551 |
| 2023/0193743 A1* | 6/2023 | Katterbauer | E21B 43/164 |
| | | | 702/6 |
| 2023/0228182 A1* | 7/2023 | Al-Rubaii | E21B 45/00 |
| | | | 175/27 |
| 2023/0359174 A1* | 11/2023 | Vazquez-Canteli | |
| | | | G05B 19/4155 |
| 2024/0086430 A1* | 3/2024 | Pickles | G01V 1/01 |
| 2024/0191616 A1* | 6/2024 | Bestman | E21B 47/06 |
| 2024/0192646 A1* | 6/2024 | Doraiswamy | G01V 20/00 |
| 2025/0053157 A1* | 2/2025 | Wright | G05D 11/132 |
| 2025/0086470 A1* | 3/2025 | Gunnerud | G06N 3/0455 |
| 2025/0189938 A1* | 6/2025 | Ahn | G05B 13/048 |
| 2025/0200328 A1* | 6/2025 | Arukhe | E21B 47/07 |
| 2025/0278082 A1* | 9/2025 | Saati | G05B 23/027 |

* cited by examiner

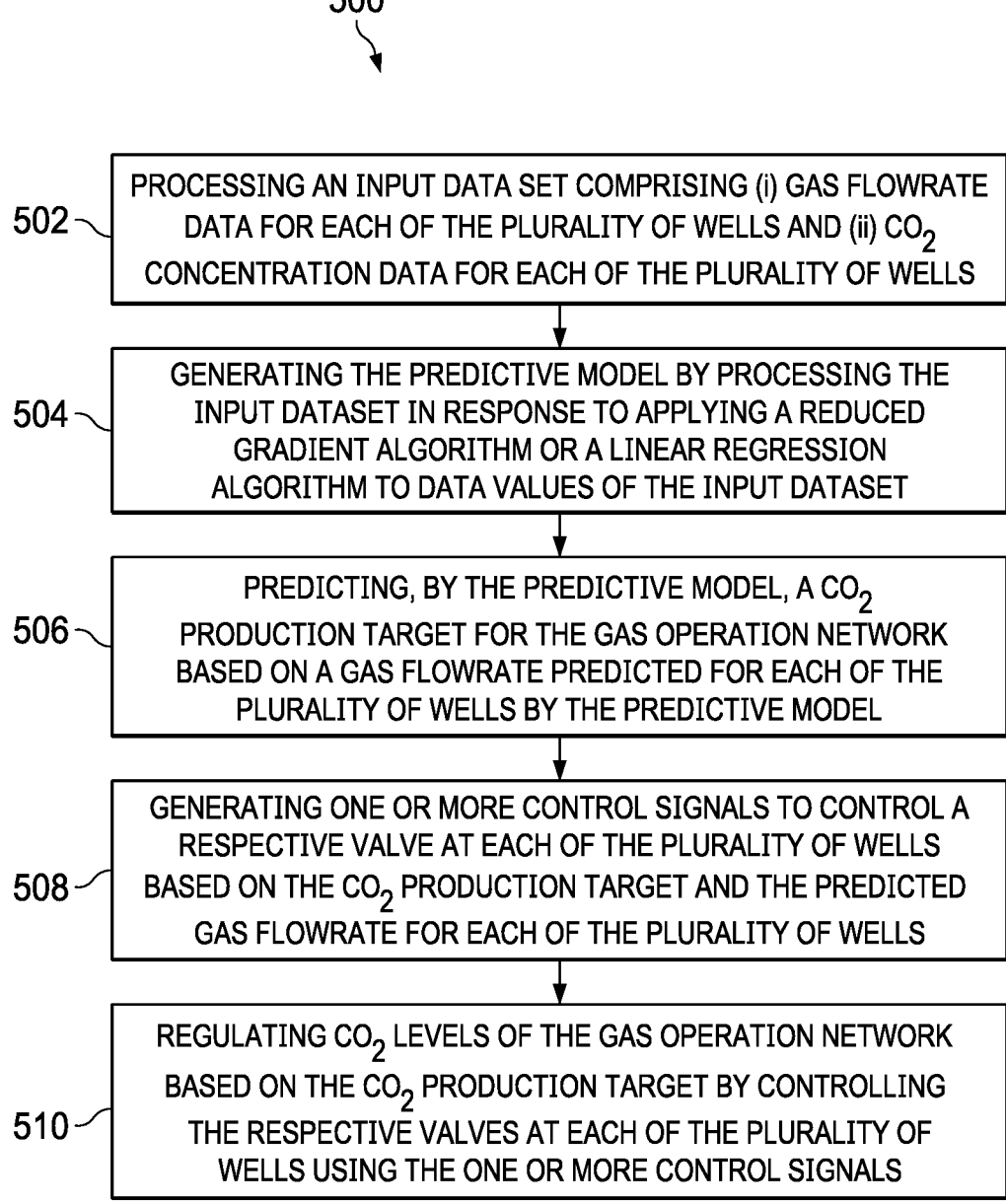

500

502 — PROCESSING AN INPUT DATA SET COMPRISING (i) GAS FLOWRATE DATA FOR EACH OF THE PLURALITY OF WELLS AND (ii) $CO_2$ CONCENTRATION DATA FOR EACH OF THE PLURALITY OF WELLS

504 — GENERATING THE PREDICTIVE MODEL BY PROCESSING THE INPUT DATASET IN RESPONSE TO APPLYING A REDUCED GRADIENT ALGORITHM OR A LINEAR REGRESSION ALGORITHM TO DATA VALUES OF THE INPUT DATASET

506 — PREDICTING, BY THE PREDICTIVE MODEL, A $CO_2$ PRODUCTION TARGET FOR THE GAS OPERATION NETWORK BASED ON A GAS FLOWRATE PREDICTED FOR EACH OF THE PLURALITY OF WELLS BY THE PREDICTIVE MODEL

508 — GENERATING ONE OR MORE CONTROL SIGNALS TO CONTROL A RESPECTIVE VALVE AT EACH OF THE PLURALITY OF WELLS BASED ON THE $CO_2$ PRODUCTION TARGET AND THE PREDICTED GAS FLOWRATE FOR EACH OF THE PLURALITY OF WELLS

510 — REGULATING $CO_2$ LEVELS OF THE GAS OPERATION NETWORK BASED ON THE $CO_2$ PRODUCTION TARGET BY CONTROLLING THE RESPECTIVE VALVES AT EACH OF THE PLURALITY OF WELLS USING THE ONE OR MORE CONTROL SIGNALS

FIG. 9

REDUCING CO₂ PRODUCTION LEVELS IN A GAS OPERATION NETWORK USING A PREDICTIVE MODEL

TECHNICAL FIELD

The present disclosure relates to predictive modeling for reducing carbon dioxide ($CO_2$) production levels in a gas operations network.

BACKGROUND

Oil and gas wells extract hydrocarbons from underground reservoirs. In some cases, extraction of the hydrocarbons results in the release of an undesirable gas—$CO_2$. The $CO_2$ can be released to the environment or sequestered back into the ground. However, releasing the $CO_2$ to the environment contributes to global warming and sequestering the $CO_2$ into the ground is an expensive process that requires complicated machinery. Thus, efficient methods for reducing overall $CO_2$ production levels are desirable for oil and gas well operations.

SUMMARY

The systems and methods described in this specification use a predictive model to reduce the amount of $CO_2$ produced from a network of oil and gas wells. The predictive model is trained based on historical data from the wells and a processing plant. The trained predictive model is used to predict how the flowrates of the wells should be changed (for example, increased or decreased) to achieve a desired (or threshold) reduction in the overall $CO_2$ produced from the network of wells. The wells are controlled based on the predicted flow rates to achieve the desired $CO_2$ reduction.

In addition to reducing the amount of $CO_2$ produced from the network of oil and gas wells, the specification describes techniques for determining how predicted flow rates affect condensate production and ethane-plus production. In some implementations, the disclosed techniques are used to select predicted flow rates of the wells based on corresponding changes in condensate production and ethane-plus production.

Some methods for reducing $CO_2$ levels of a gas operation network using a predictive model include one or more of the following steps. In some implementations, the gas operation network includes a plurality of wells. Some methods include processing an input data set including (i) gas flowrate data for each of the plurality of wells and (ii) $CO_2$ concentration data for each of the plurality of wells. Some methods include generating the predictive model by processing the input dataset in response to applying a reduced gradient algorithm or a linear regression algorithm to data values of the input dataset. Some methods include predicting, by the predictive model, a $CO_2$ production target for the gas operation network based on a gas flowrate predicted for each of the plurality of wells by the predictive model. Some methods include generating one or more control signals to control a respective valve at each of the plurality of wells based on the $CO_2$ production target and the predicted gas flowrate for each of the plurality of wells. Some methods include regulating $CO_2$ levels of the gas operation network based on the $CO_2$ production target by controlling the respective valves at each of the plurality of wells using the one or more control signals.

In some examples, the input dataset includes historical data from a previous time period and the predictive model is generated based on a training phase that coincides with the previous time period or overlaps the previous time period. In some examples, the previous time period spans at least 100 days.

Some methods include a threshold $CO_2$ level for the plurality of wells based on (i) the gas flowrate data for each of the plurality of wells and (ii) the $CO_2$ concentration data for each of the plurality of wells.

In some implementations, the predictive model is based on the threshold $CO_2$ level for each of the plurality of wells and a corresponding production factor.

Some gas operation networks include a plurality of gas gathering manifolds and a plurality of slug catchers. In such cases, some methods include generating the predictive model by determining a total gas production of each of the plurality of gas gathering manifolds based on historical gas flowrate data for each of the plurality of wells connected to a corresponding gas gathering manifold; comparing the total gas production of each of the plurality of gas gathering manifolds to a gas flowrate measured at each of the plurality of slug catchers; and updating the predictive model based on the comparison.

In some implementations, generating the predictive model includes minimizing a difference between (i) $CO_2$ production predictions for the gas operation network and (ii) $CO_2$ production data for the gas operation network.

In some implementations, generating the predictive model includes solving a minimization problem using at least one of a generalized reduced gradient solver and a multiple linear regression solver.

In some implementations, predicting the $CO_2$ production target of the gas operation network includes satisfying one or more production conditions. In some examples, the one or more production conditions include a maximum $CO_2$ production level of the gas operation network. In some examples, the one or more production conditions include a minimum condensate production level of the gas operation network.

In some implementations, predicting the $CO_2$ production target for the gas operation network includes: predicting a plurality of $CO_2$ production levels based on a gas flowrate variation for at least one well of the plurality of wells; determining a plurality of $CO_2$ production differences between each of the plurality of $CO_2$ production levels and a baseline $CO_2$ production level; and selecting the $CO_2$ production target based on the overall $CO_2$ production differences. In some examples, the gas flowrate variation represents a variation between a reduction in gas production of the at least one well of the plurality of wells by 50% and an increase in gas production of the at least one well of the plurality of wells by 50%.

In some implementations, selecting the $CO_2$ production target includes: predicting a condensate production level for the gas operation network for each of the plurality of $CO_2$ production levels by multiplying each predicted gas flowrate of the gas flowrate variation with a condensate-gas-ratio for each of the plurality of wells; determining a plurality of condensate production differences between each of the condensate production levels and a baseline condensate production level; and selecting the whole network $CO_2$ production target based on the overall $CO_2$ production differences and the overall condensate production differences. In some examples, the method includes measuring, by one or more separator tests located at each well, the condensate-gas-ratio for each of the plurality of wells.

In some implementations, the method includes: measuring, by one or more gas flow meters located at each of the plurality of wells, the historical gas flowrates; measuring, by one or more separator tests located at each of the plurality of wells, the historical $CO_2$ concentration data; and measuring, by a $CO_2$ meter located at a gas processing plant or downstream of the gas processing plant, the historical $CO_2$ production data.

Some systems for reducing CO2 levels of a gas operation network using a predictive model include one or more of the following features. In some systems, the gas operation network includes a plurality of wells. Some systems include a plurality of gas flow meters operable to measure a gas flowrate of a gas at each of the plurality of wells. Some systems include a CO2 concentration measurement device operable to measure a CO2 concentration of the gas at the plurality of wells. Some systems include a CO2 meter operable to measure a network CO2 production level of the gas. In some examples, the network CO2 meter is located at a gas processing plant of the gas operation network or downstream of the gas processing plant. Some systems include a plurality of valves operable to control a flow of the gas at the plurality of wells. Some systems include a computer storing instructions that, when executed by a processor of the computer, cause the processor to perform one or more of the steps described in this specification.

Some processors process an input dataset including (i) the measured gas flowrate for each of the plurality of wells and (ii) the measured $CO_2$ concentration for each of the plurality of wells. Some processors generate the predictive model by processing the input dataset in response to applying a reduced gradient algorithm or a linear regression algorithm to data values of the input dataset. Some processors predict, by the predictive model, a $CO_2$ production target for the gas operation network based on a gas flowrate predicted for each of the plurality of wells by the predictive model. Some processors generate one or more control signals to control each of the plurality of valves at each of the plurality of wells based on the $CO_2$ production target and the predicted gas flowrate for each of the plurality of wells. Some processors regulate $CO_2$ levels of the gas operation network based on the $CO_2$ production target by controlling each of the plurality of valves at each of the plurality of wells using the one or more control signals.

In some systems, the gas operation network includes a plurality of gas gathering manifolds. In some systems, the gas operation network includes a plurality of slug catchers.

The systems and methods described in this specification provide various advantages.

By training a predictive model using historical data from multiple wells and spanning of time period of at least 100 days, the predictive model described in this specification is able to accurately predict how changes in flow rates of each individual well and/or changes in flow rates at a gas gathering manifold will change the overall $CO_2$ production of a gas operation network.

By training a predictive model using at least two independent numerical solvers, at least two independent results are generated. The independent results can then be compared with each other to for verification. This comparison and verification process is used to improve the accuracy of the predictions and to realize increases in user confidence when a user interprets the results and selects a flow rate variation strategy to reduce $CO_2$ production levels.

By selecting the flow rate variation result that achieves a reduction in $CO_2$ production while simultaneously achieving either no change in concentrate production levels and/or an increase in concentrate production levels, the environment is saved while simultaneously increasing production.

By controlling the valves located at each well based on the results of the predictive model, the overall $CO_2$ production levels can be decreased.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

FIG. 9 is a method for reducing the overall $CO_2$ production level of the gas operation network using the predictive model.

Like reference symbols in the various drawings indicate like elements.

DETAILED DESCRIPTION

This specification describes techniques for training and generating a predictive model that is operable to reduce an amount of $CO_2$ produced from a network of oil and gas wells. The predictive model is trained based on historical data from the wells and a processing plant. The trained predictive model is used to predict how flowrates of the oil and gas wells should be changed (for example, increased or decreased) to achieve a desired (or threshold) reduction in overall $CO_2$ produced from the network of wells. An example threshold by which to reduce the $CO_2$ can be user specified, dynamically determined, or both. The wells are controlled based on the predicted flow rates to achieve the desired $CO_2$ reduction.

Figure 1:
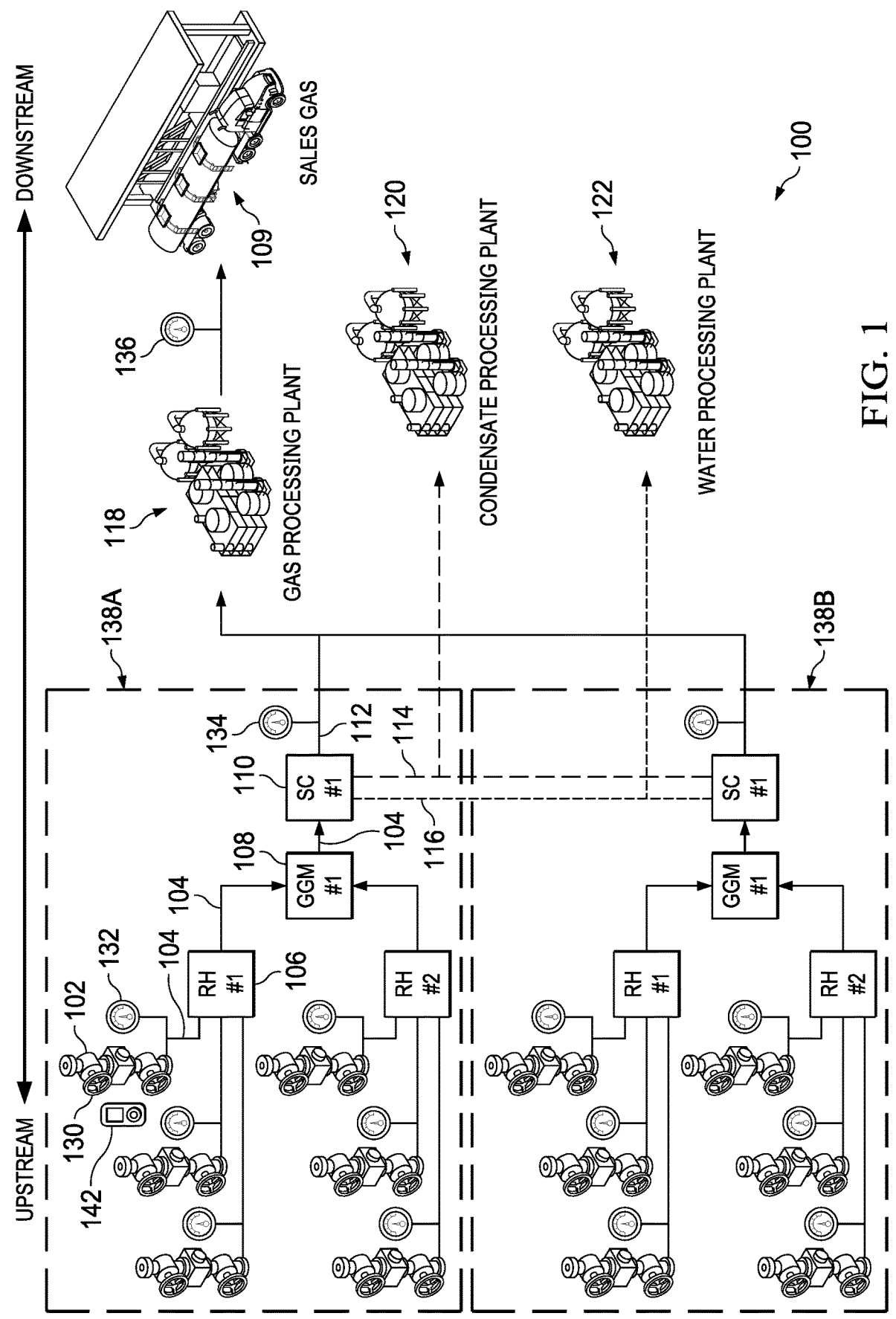
FIG. 1 is a schematic illustration of a gas operation network.

FIG. 1 is a schematic of a gas operation network 100. The network 100 includes one or more wells 102. The wells 102 extract a mixture of condensate, gas, and water from a reservoir underneath the ground. In most cases, the mixture includes at least some hydrocarbons (for example, natural gas, methane, butane, hexane, and crude oil). In most cases, the mixture includes $CO_2$. In some cases, the wells 102 include pumps to pump the mixture from the reservoir. In some examples, the mixture includes condensed water and/ or wet gas. Based on the concentration of hydrogen sulfide ($H_2S$), a well with significant amounts of $H_2S$ is called "sour gas" where "sweet gas" is named for the natural gas that contains very little or no hydrogen sulfide. In other words, a sour gas well may be a natural gas well that generally includes large amounts of $H_2S$, whereas a sweet gas well may be a natural gas well that includes only trace amounts of $H_2S$.

The mixture is distributed through the network 100 using pipelines 104, separated and processed into streams of the constituents of the mixture (for example, separate streams of gas, condensate, and water), and the constituents are stored and/or the gas is distributed as sales gas 109. As the mixture flows from the wells 102 to the sales gas point 109 through the various pipelines 104, the mixture flows "downstream." In this way, the wells 102 are considered "upstream," whereas the sales gas point 109 is considered "downstream."

The network 100 includes one or more remote headers 106 (RH). In the example network 100 shown in FIG. 1, distinct sets of three wells 102 are connected to a corresponding common remote header 106 using pipelines 104. In some networks, more than three wells 102 are connected to a common remote header 106 (for example, five or ten wells). In some networks, less than three wells 102 are connected to a common remote header 106 (for example, one or two wells). Each remote header 106 includes a manifold to receive a respective mixture from each of the wells 102 and to output a corresponding mixture to a gas gathering manifold 108. The corresponding mixture(s) may be output by the remote header 106 as a single stream. For example, each remote header 106 can provide a point of comingling of natural gas production from a group of wells.

The network 100 includes one or more gas gathering manifolds 108 (GGM). In the example of FIG. 1, two remote headers 106 are connected to a common gas gathering manifold 108 using pipelines 104. In some networks, more than two remote headers 106 are connected to a gas gathering manifold 108 (for example, five or ten remote headers). In some networks, one remote header 106 is connected to a gas gathering manifold 108. The gas gathering manifold 108 includes a manifold to receive a respective mixture from each of the remote headers 106 and to output a corresponding mixture to a slug catcher 110. The corresponding mixture(s) may be output by the gas gathering manifold 108 as a single stream. For example, each gas gathering manifold 108 can provide a point of comingling of natural gas production from a group of remote headers.

The network 100 includes one or more slug catchers 110 (SC). In some implementations, the slug catcher 110 is used to separate gas, condensate, and water. In the example of FIG. 1, one gas gathering manifold 108 is connected to a corresponding common slug catcher 110 using pipelines 104. In some networks, more than one gas gathering manifold 108 is connected to a slug catcher 110 (for example, two, five, or ten gas gathering manifolds). The slug catchers 110 separate the mixture into respective streams of gas, water, and condensate. Other aspects of network 100 illustrated in the example of FIG. 1 are described later in this document.

Figure 2:
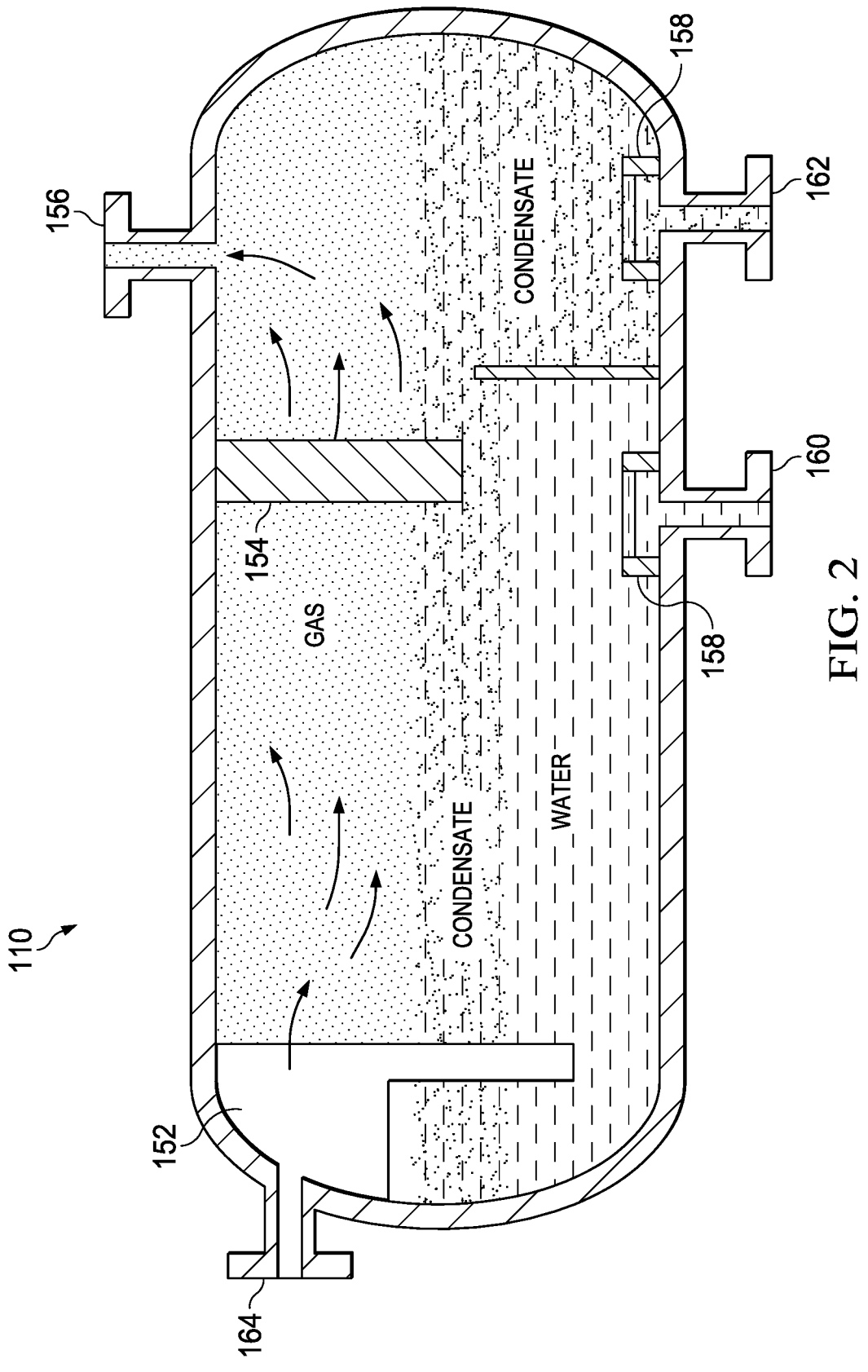
FIG. 2 is a schematic illustration of a slug catcher of the gas operation network.

FIG. 2 is a schematic illustration of an example slug catcher used in the network 100. The slug catcher 110 (sometimes referred to as a separator) includes a mixture inlet port 164, a gas outlet port 156, a water outlet port 160, and a condensate outlet port 162. The slug catcher 110 includes a catcher 152, a demister 154, and vortex breakers 158. The mixture enters through the inlet port 164 and is separated into gas, condensate, and water. Since gas is lighter than water and condensate, the gas rises above the water and condensate and flows out of the slug catcher 110 through the gas outlet port 156 located on the top of the slug catcher 110. In some examples, the separated gas includes hydrocarbons and $CO_2$.

Since the separated water is heavier than the separated gas and condensate, the water sinks to the bottom of the slug catcher 110 and flows through the water outlet port 160 located on the bottom of the slug catcher 110. The condensate floats between the water and the gas and flows through the condensate outlet port 162 also located on the bottom of the slug catcher 110.

In some implementations, the slug catcher 110 removes the acid-gas (for example, the $H_2S$ and/or $CO_2$) to meet sales-gas specifications. In some implementations, the slug catcher 110 includes dew point and dehydration process units for cooling the gas to remove moisture and to reduce (or prevent) condensation from developing in the gas. In some implementations, the dew point and dehydration process units dehydrate the gas to reduce (or prevent) hydrate formation in the pipelines.

In some implementations, the network 100 includes a gas treating or sweetening unit that removes acid-gas to meet sales-gas specifications. In some implementations, both a slug catcher 110 and a gas treating or sweetening unit is used in tandem to remove acid-gas to meet sales-gas specifications.

Referring back for FIG. 1, the network 100 includes a gas processing plant 118. The separated gas flows through pipelines 112 from the one or more slug catchers 110 to the gas processing plant 118. In the example network 100 shown in FIG. 1, two slug catchers 110 are connected to a common gas processing plant using pipelines 112. In some networks, more than two slug catchers 110 are connected to a gas processing plant 118 (for example, five or ten slug catchers). In some networks, one slug catcher 110 is connected to a gas processing plant 118.

The gas processing plant 118 receives gas that was separated by a particular slug catcher 110 and processes and/or treats the gas (for example, filters the gas using one or more filters). The gas separated by a given slug catcher 110 may be a mixture of gas streams. The gas processing plant 118 processes this mixture to separate the gas into gas streams representing a particular chemical compound. For example, the gas processing plant 118 processes a gas mixture that includes methane, butane, hexane, and $CO_2$ into separate streams of methane, butane, hexane, and $CO_2$. In some implementations, the gas processing plant 118 processes gas by removing acid from the gas, compressing the gas, and delivering the gas to a natural gas liquid (NGL) plant to recover the Ethane plus (C2+).

In some implementations, the gas processing plant 118 does not remove $CO_2$ from the gas. For example, the gas processing plant 118 delivers Methane (C1) to a master gas network system where there is no $CO_2$ removal. In some implementations, the NGL plant has a gas treating train to remove $CO_2$ from the sales-gas before entering the NGL train.

The network 100 includes a condensate processing plant 120. The separated condensate flows through pipelines 114 from the one or more slug catchers 110 to the condensate processing plant 120. In some implementations, the condensate processing plant 120 distills the condensate by removing $H_2S$ which improves the suitability of the condensate for storage and transport. In some implementations, the condensate processing plant 120 refines the condensate into gasoline. In some implementations, the condensate processing plant 120 stabilizes the condensate by running the condensate through a condensate stabilizer to reduce the vapor pressure and remove impurities from the condensate.

The network 100 includes a water processing plant 122. The separated water flows through pipelines 116 from the one or more slug catchers 110 to the water processing plant 122. In some implementations, the water processing plant 120 processes the water (for example, filters the water using one or more filters and sterilizes the water using a heat source) into safe drinking water. In some implementations, the water processing plant 120 processes the water by running the water through a sour water stripper to remove the acid-gas from water. In one example, the water processing plant 120 can supplement acid-gas removal operations performed by a slug catcher 110, whereas in another example the water processing plant 120 provides acid-gas removal operations that are an alternative to operations performed by a slug catcher 110.

While the gas processing plant 118, the condensate processing plant 120, and the water processing plant 122 are represented separately in FIG. 1, in some implementations, the gas processing plant 118, the condensate processing plant 120, and water processing plant 122 are part of a single processing plant.

Each well 102 includes one or more valves 130 and a gas flow meter 132 disposed along the pipeline 104 near each well 102 (for example, at each well 102). The valves 130 include an electrically controllable flow restrictor to control a flow of the mixture from the wells 102 and the gas flow meter 132 measures a flowrate of the mixture flowing through the pipeline between the wells 102 and the remote header 106. Each valve 130 and each gas flow meter 132 is connected to a computer system 252 (described with reference to FIG. 3). In some implementations, the flow meter 132 is a wet gas Venturi-meter. In some implementations, the flow meter 132 is a multiphase flow meter.

In some implementations, the network 100 includes a CO2 concentration measurement device 142 (for example, a mobile separator, a gas sampling pump, and/or, a Dreager® tube) operable to measure the $CO_2$ concentration of the wells 102. In some examples, the $CO_2$ device measures the $CO_2$ concentration of the well 102 during the initial flow back operations. In some cases, there is no continuous measurement of $CO_2$ concentration level at the well 102 and the initial flow back measurement is updated irregularly based on results from a separator test gas sample analysis.

In the example shown in FIG. 1, the CO2 concentration measurement device 142 is a mobile testing separator. In some implementations, the mobile testing separator performs a gas sample analysis to determine the $CO_2$ concentration of the well 102 by analyzing the gas composition of the gas-phase after the gas is separated from the condensate and water phase. For example, in some implementations, mobile testing separator is operable to separate the multiphase fluid from the well 102, measure the flowrate for any phase (for example, gas, condensate/oil, or water phase), and measure the flowrate for any gas composition (for example, $CO_2$, $H_2S$, $N_2$, $C_1$, $C_2$, etc.). In some implementations, the mobile testing separator is a mobile device that is movable from one well to another well so that an engineer can test the $CO_2$ concentration for each well 102 in the network 100 by traveling to each well 102 and measuring the gas composition at each well 102. In some implementations, each well 102 includes a mobile testing separator for determining the $CO_2$ concentration at each respective well 102. In some implementations, the computer system 252 executes a deliverability test program that performs the deliverability test such that the $CO_2$ concentration measurement device 142 measures the $CO_2$ concentration of the well 102 during the deliverability test.

Each slug catcher 110 includes a gas flow meter 134. For example, the gas flow meter 134 can be installed at the slug catcher 110 or disposed along the pipeline 112 near each slug catcher 110 (for example, adjacent the slug catcher 110). The flow meter 134 measures a flow rate of the separated gas that flows out of the slug catcher 110. In examples where the extracted gas includes $CO_2$, the flow meter 134 measures a flow rate of the separated gas that includes $CO_2$. The flow meter 134 measures a total gas production for all wells 102 upstream of the slug catcher 110. In some implementations, the flow meter 134 is a wet gas Venturi-meter. In some implementations, the flow meter 134 is a multiphase flow meter.

The gas processing plant includes a whole network $CO_2$ meter 136 disposed along a pipeline downstream of the gas processing plant (for example, immediately downstream of the gas processing plant 118, at the gas processing plant 118, or at the sales-gas point 109). The $CO_2$ meter 136 measures a whole network $CO_2$ production level of the processed gas that flows out of the gas processing plant 118. The whole network $CO_2$ production level represents the $CO_2$ content of the whole gas operation network 100. In some implementations, the $CO_2$ meter 136 is a gas analyzer. As noted above, in implementations where there is no $CO_2$ removal at the gas processing plant 118, the whole network $CO_2$ production level represents the overall $CO_2$ concentration of all wells 102 of the gas operation network 100.

The gas operation network 100 includes one or more groups 138A, 138B of wells 102. A unique group is defined for each slug catcher 110 used in the gas operation network 100 and the group representing a grouping of all the wells 102 upstream of the respective slug catcher 110. In the example network 100 shown in FIG. 1, the gas operation network 100 includes two groups 138A, 138B. Each group includes six wells 102 (each including a flow meter 132 and a valve 130), two remote headers 106, one gas gathering manifold 108, and one slug catcher 110 (each including a flow meter 134).

In some networks, more than two groups are connected to the gas processing plant 118 (for example, five or ten groups). In some networks, one group is connected to the gas processing plant 118. In some networks, more than six wells 102 are included a group (for example, five or ten wells). In some networks, less than six wells 102 are included a group (for example, one, two, or three wells). In some networks, each group contains a different number of wells. For example, one group can have twice as many wells as another group.

Figure 3:
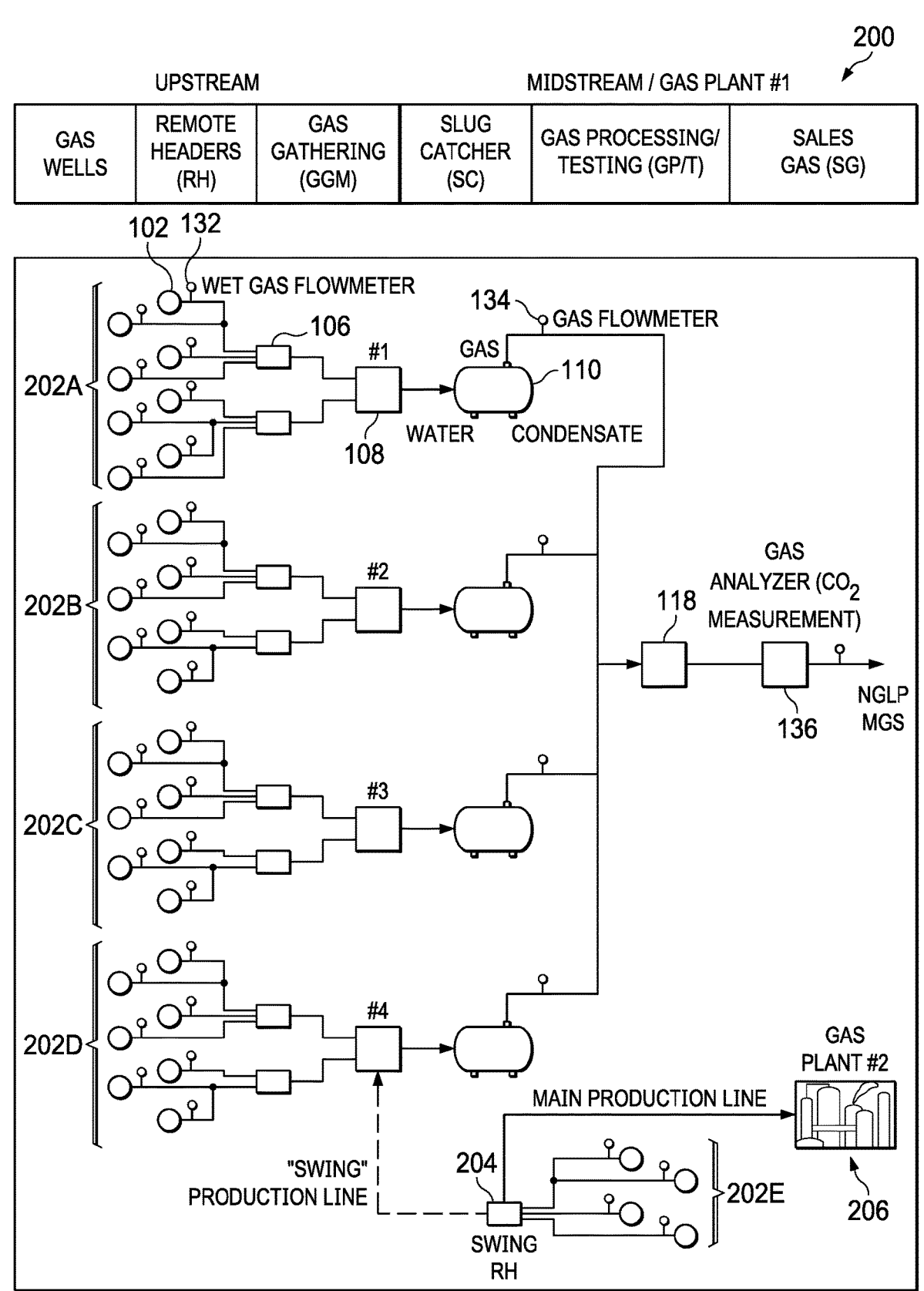
FIG. 3 is an expanded schematic of the gas operation network.

FIG. 3 is a schematic of a gas operation network 200. Gas operation network 200 is similar to gas operation network 100 but includes five groups 202A-202E with thirty-three wells total. Gas operation network 200 also includes a swing remote header 204 for diverting the production of the wells of group 202E from the gas processing plant 118 to an alternate gas processing plant 206.

Figure 4:
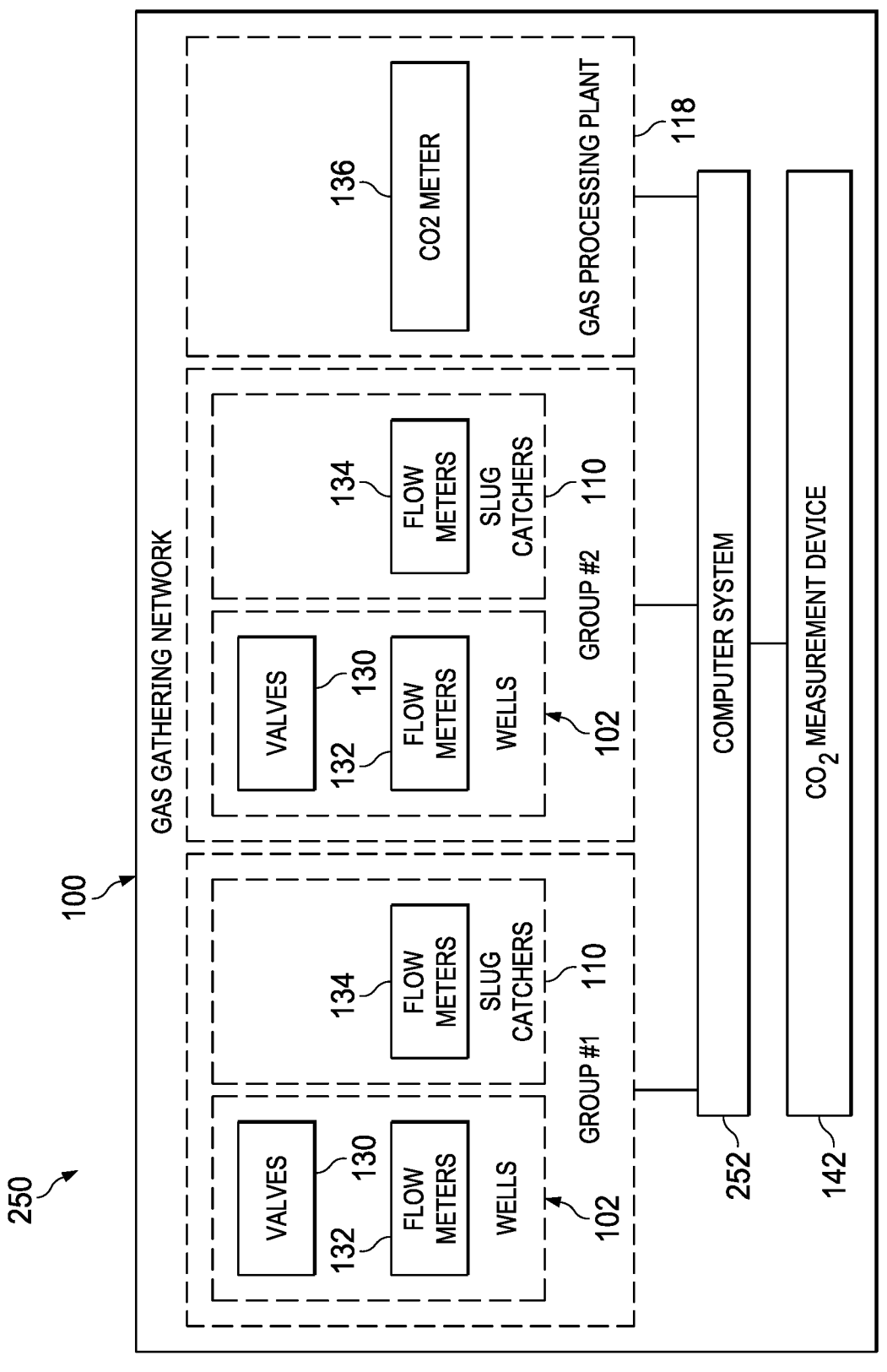
FIG. 4 is a schematic representation of a computer network of the gas operation network.

FIG. 4 is a schematic representation of a computer network 250 of the gas operation network 100. The computer network 250 includes the computer system 252, the whole network $CO_2$ meter 136, each valve 130, the CO2 concentration measurement device 142 (for communicating the CO2 value of the individual wells 102), each flow meter 132, and each flow meter 134, all in electrical or network communication with each other. The computer system 252 includes various computer components (for example, monitors and processors). In some implementations, the computer system 252 includes some or all of the components of the computer system 600 described with reference to FIG. 10.

The computer system 252 includes computer software for implementing a data model that can be trained to generate a predictive model. For example, the computer system 252 can include a machine-learning engine that processes an input dataset to generate the predictive model. More specifically, a data model of the machine-learning engine uses one or more machine-learning algorithms to iteratively process data values of the input dataset to arrive at an initial trained version of the predictive model. The machine-learning engine, including the predictive model, may be implemented in hardware, software, or both. For example, the machine-learning engine of the computer system 252 can include programmed instructions, that when executed, trains a predictive model to determine a total gas production of each gas gathering manifold of the gas operation network. This means that the trained predictive model can be used to predict how flow rate changes will affect the $CO_2$ production.

In some implementations, the machine-learning engine can include an initial training phase where a training set of data values are processed to train the predictive model and an implementation phase. During the implementation phase the predictive model is used to, for example, predict parameters for adjusting flowrates of the wells 102 (for example, increasing or decreasing) to achieve a desired (or threshold) reduction in overall $CO_2$ produced from network of wells. For example, once the predictive model is trained, the computer system 252 can use its software, programmed instructions, or executed code to determine (or predict) control parameters for the valves 130 to reduce the flow rates of the wells 102 that produce the most $CO_2$. This reduction in $CO_2$ contributes to a reduction in $CO_2$ of the gas operation network overall.

Figure 5:
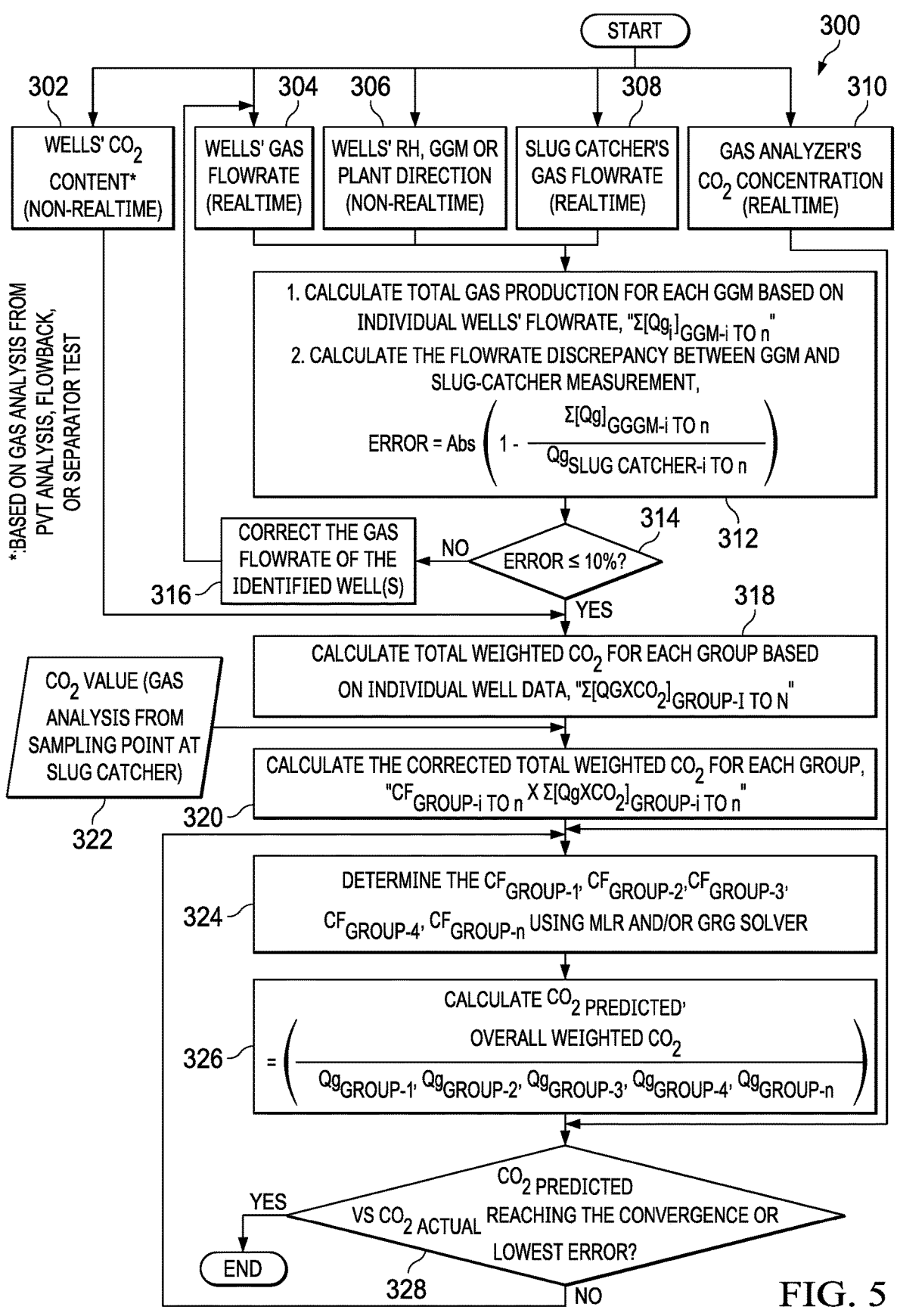
FIG. 5 is a method of training a predictive model for reducing an overall $CO_2$ production level of the gas operation network.

FIG. 5 is a method 300 used to train a predictive model to generate parameters for reducing the overall $CO_2$ production level of a gas operation network (for example, the gas operation network 100). At block 302, the computer system 252 receives the $CO_2$ concentration level measurements ($CO_2$ value) from the CO2 concentration measurement device 142. As noted above with reference to FIG. 1, the CO2 value of each well 102 is based on a gas analysis measurement of the flow back or the separator test result from the well deliverability testing operations. In some examples, the $CO_2$ concentration measurement device 142 measures the $CO_2$ concentration level in non-real-time and transmits the $CO_2$ concentration level to the computer system 252 when measured. For example, an engineer performs a flow back experiment and measures the $CO_2$ concentration level using the CO2 concentration measurement device 142. Once measured, the engineer transmits the measurement to the computer system 252.

At block 304, the one or more gas flow meters 132 measure a flowrate of the mixture produced from the wells 102 and the computer system 252 receives the flowrate measurements from the flow meters 132. In some examples, the flow meters 132 measure the flow rate in real-time and transmit the measured flow rate to the computer system 252 in real-time.

At block 306, a directional flow meter measures the direction of flow of the gas. This measurement is performed in non-real-time. In some examples, the swing remote header 204 (shown in FIG. 3) includes a direction flow meter that determines (i) a flow rate of the mixture travelling from the swing remote header 204 to the #4 remote header 106 and (ii) a flow rate of the mixture travelling from the swing remote header 204 to the #2 gas plant 206. In some examples, the directional information represented by these two flow rates is used as an input of the method 300 and used in steps performed at block 312 (described below). For example, the production of the swing remote header's wells (for example, the wells of group 202E) are not counted in the calculation process of block 312 if a threshold quantity (for example, above 85%) of the flow is travelling from the swing remote header 204 to the #2 gas plant 206. As another example, the production of the swing remote header's wells are counted in the calculation process of block 312 if the threshold quantity of the flow is travelling from the swing remote header 204 to the #4 remote header 106. In this way, the directional flow meter determines a directional flow rate that represents a flow rate of the mixture that is received by the network CO2 meter 136.

At block 308, the one or more flow meters 134 of the slug catchers 110 measure a flow rate of the separated gas that flows out of the slug catcher 110 and the computer system 252 receives the flow rate measurements from the flow meters 134. In some examples, the flow meters 134 measure the flow rate in real-time and transmit the measured flow rate to the computer system 252 in real-time.

At block 310, a whole network $CO_2$ meter 136 measures a whole network $CO_2$ production level of the processed gas that flows out of the gas processing plant 118 and the computer system 252 receives the whole network $CO_2$ production level measurement from the $CO_2$ meter 136. In some examples, the $CO_2$ meter 136 measures the whole network $CO_2$ production level in real-time (for example, as compared to a past-time) and transmits the measured whole network $CO_2$ production level to the computer system 252 in real-time.

In some examples, the received measurements from blocks 302, 304, 306, 308, and 310 represent historical data spanning at least 100 days. In some examples, this historical data is used to train the predictive model. For example, the historical data can represent a training set of production level training data that include representative values for gas concentrations, flow rate, $CO_2$ levels. The training set/data is processed at the machine-learning engine in accordance with one or more predictive tools of the machine-learning engine. For example, the predictive tools can be machine-learning algorithms for applying one or more numerical solvers to generate data predictions for reducing an amount of $CO_2$ produced from a network of oil and gas wells. Based on the algorithms, predictive models of computer system 252 are trained to generate these data predictions in response to applying a multiple linear regression (MLR) numerical solver, a generalized reduced gradient (GRG) numerical solver, or both.

At block 312, the computer system 252 calculates a total gas production for each group based on the flow rates from each of the individual wells within a particular group. For example, the computer system 252 sums the gas flow rates ($Qg_i$) received from each flow meter 132 for all wells within a particular group (for example, from i=1 to i=m, where m represents the total number of wells within the particular group). In some implementations, the computer system determines the total gas production by evaluating Eq. (1):

$$Qg_{Group-i} = [Qg_{well\ \#1} + Qg_{well\ \#2} + Qg_{well\ \#3} + \cdots]_{Group-i} \qquad \text{Eq. (1)}$$

The result is the total gas production for each group (for example, group 138A, 138) of the gas operation network 100. In examples where historical data is available, the computer system 252 determines a total gas production of each group (or gas gathering manifold) of the gas operation network based on the historical gas flowrate data for each well within a particular group of wells connected to the respective gas gathering manifold.

Also at block 312, the computer system 252 compares the total gas production of each gas gathering manifold to the received gas flowrate measured at the slug catcher 110 for the respective group (for example, from block 308). The computer system 252 calculates an error based on the comparison. For example, the computer system 252 determines an error based on an absolute value of 1 minus the total gas production for each gas gathering manifold divided by the gas flowrate measured at the slug catcher.

At block 314, the computer system 252 determines whether the error is less than an acceptable range. For example, the computer system 252 determines whether the error is less than 10%. If the error is greater than the acceptable range, the computer system 252 proceeds to block 316 and notifies an engineer that the received measurements fall outside of an acceptable range. In some examples, the received measurements can be suspect due to a hardware malfunction (for example, when a flow meter malfunctions). In response, the engineer can repair or replace the hardware (for example, the respective flow meters) and re-measure the respective quantities. In some implementations, the computer system 252 automatically updates the predictive model to reduce the error by removing the measurements associated with wells and/or groups of wells that have large errors. In this way, the computer system 252 updates the predictive model based on the comparison of the error to the acceptable range. For example, following an initial training phase of a predictive model, the model can iteratively adjust weightings assigned to different variables in response to processing new sets of data production values. In some implementations, during implementation the model can tune or adjust its weightings to determine the optimum correction factors for each gas gathering manifold.

If the error is less than the acceptable range (for example, within the acceptable range) the computer system 252 proceeds to block 318 and calculates a weighted $CO_2$ production level for each group of wells of the gas operation network 100. The weighted $CO_2$ production level for each group of wells of the gas operation network 100 represents an initial estimate for how much $CO_2$ is produced by each group of wells. In some implementations, the computer system 252 determines the weighted $CO_2$ production level for each group of wells ($\Sigma(Qg \times CO_2)_{Group-i}$) by evaluating Eq. (2):

$$\Sigma(Qg \times CO_2)_{Group-i} = [Qg_{well\ \#1} \times CO_{2\ well\ \#1} + Qg_{well\ \#2} \times CO_{2\ well\ \#2} + Qg_{well\ \#3} \times CO_{2\ well\ \#3} + \ldots]_{Group-i} \qquad \text{Eq. (2)}$$

As indicated in Eq. (2), in some implementations, the computer system 252 calculates the weighted $CO_2$ production level for each group of wells based on (i) the gas flow rate data for each well of a particular group of wells from block 304 (for example, $Qg_{well\ \#1}$) and (ii) the $CO_2$ concentration data for each well of the particular group of wells from block 302 (for example, $CO_{2\ well\ \#1}$). For example, the computer system 252 multiplies the gas flowrate data for each well of a particular group of wells from block 304 and the $CO_2$ concentration data for each well of the particular group of wells from block 302 together. In examples where the historical data is used, the computer system 252 determines a (weighted) $CO_2$ production level for each group of wells of the gas operation network based on (i) the historical gas flowrate data for each well of a particular group of wells and (ii) the historical $CO_2$ concentration data for each well of the particular group of wells.

At block 320, the computer system 252 defines a regression equation representing the corrected $CO_2$ production level for each group of wells of the gas operation network 100. The $CO_2$ production level represents the equation of block 318 multiplied by a production factor—$CF_{Group-j}$, where j is the group number and increments from 1 to n, where n is the total number of groups in the gas operation network 100. In some implementations, the computer system 252 defines the corrected $CO_2$ production level by evaluating Eq. (3):

Overall Weighted $CO_2$ calculated=$[CF_{Group-1} \times \Sigma(Qg \times CO_2)_{Group-1}] + [CF_{Group-2} \times \Sigma(Qg \times CO_2)_{Group-2}] + [CF_{Group-3} \times \Sigma(Qg \times CO_2)_{Group-3}] + [CF_{Group-4} \times \Sigma(Qg \times CO_2)_{Group-4}] + \ldots + [CF_{Group-n} \times \Sigma(Qg \times CO_2)_{Group-n}]$      Eq. (3)

As noted above, gas operation network 100 includes two groups and gas operation network 200 includes five groups. Each group has an independent production factor, $CF_{Group-1}$, $CF_{Group-2}$, . . . $CF_{Group-n}$ that is determined when the predictive model is trained. The predictive model is based on the $CO_2$ production level (for example, $\Sigma(Qg \times CO_2)_{Group-1}$) for each group of wells and a production factor (for example, $CF_{Group-1}$) for each respective group of wells. In this way, the predictive model includes a function (Eq. (3)) of the $CO_2$ production level for each group of wells multiplied by the production factor for each respective group of wells.

At block 322, the a $CO_2$ value is measured from a sampling point of the slug catcher 110. This $CO_2$ value is then transmitted to the computer system 252 and received by block 320. In some examples, a Gas Chromatography system (e.g., by Agilent technology) measures the $CO_2$ value from the slug catcher 110. In some examples, initial values for the production factors described in block 320 are determined based on the measured $CO_2$ value. In this way, the measured $CO_2$ value can assist the numerical solver by determining initial values that improve the initial guess of the iteration process. In some implementations, the flow meters 134 for the gas phase determine the $CO_2$ values of block 322. In this way, the values of block 322 represent a sampling point located on the gas line as part of the flow meters 134.

At blocks 324, 326, and 328, the computer system 252 trains the predictive model. In particular, the computer system 252 determines the values for each production factor $CF_{Group-1}$, $CF_{Group-2}$, . . . $CF_{Group-n}$ using a numerical solver. In some implementations, the computer system 252 trains the predictive model using at least one of a multiple linear regression (MLR) numerical solver and generalized reduced gradient (GRG) numerical solver. For example, the computer system 252 trains the predictive model by solving a minimization problem using at least one of a generalized reduced gradient solver and a multiple linear regression solver.

In some implementations, the computer system 252 trains the predictive model by calibrating the production factors for each group of wells ($CF_{Group-1}$, $CF_{Group-2}$, . . . $CF_{Group-n}$) of Eq. (3) based on the error conditions of Eqs. (4) and (5):

$$CO2_{Predicted} = \frac{\text{Overall Weighted } CO2_{calculated}}{Qg_{Group-1} + Qg_{Group-2} + Qg_{Group-3} + Qg_{Group-4} + \ldots Qg_{Group-n}} \qquad \text{Eq. (4)}$$

$$\text{Error (variance)} = \text{Abs}\left(\frac{CO2_{predicted} - CO2_{measurement}}{CO2_{measurement}}\right) \qquad \text{Eq. (5)}$$

In particular, the production factors, $CF_{Group-1, 2, 3, 4, \ldots n}$, are each determined by using the computer system 252 to find the minimum error value between the $CO_2$ predicted and the $CO_2$ measurement of sales-gas using a non-linear solver. In some implementations, this step involves minimizing a difference between (i) each data set of one or more whole network $CO_2$ production predictions for the gas operation network and (ii) each data set of the historical whole network $CO_2$ production data for the gas operation network. The $CO_2$ measurement is the whole network $CO_2$ production level measurement from the whole network $CO_2$ meter 136.

In some implementations, the computer system 252 defines the overall weighted $CO_2$ calculated value using Eq. (1) when the generalized reduced gradient numerical solver is used. In some implementations, the computer system 252 defines the overall weighted $CO_2$ calculated value using Eq. (6) when the multiple linear regression numerical solver is used.

$$\text{Overall Weighted } CO_2 \text{ calculated}=[CF_{Group\text{-}1} \times \Sigma(Qg \times CO_2)_{Group\text{-}1}]+[CF_{Group\text{-}2} \times \Sigma(Qg \times CO_2)_{Group\text{-}2}]+ [CF_{Group\text{-}3} \times \Sigma(Qg \times CO_2)_{Group\text{-}3}]+[CF_{Group\text{-}4} \times \Sigma (Qg \times CO_2)_{Group\text{-}4}]+ \cdots +[CF_{Group\text{-}n} \times \Sigma(Qg \times CO_2)_{Group\text{-}n}]+\text{Intercept} \quad \text{Eq. (6)}$$

In this implementation, a difference between Eq. (6) and Eq. (3) is the inclusion of the "intercept" term that is used by the multiple linear regression numerical solver but not the generalized reduced gradient numerical solver. In such cases, the Intercept term becomes an independent parameter that the computer system 252 determines as part of the training process.

The computer system 252 trains the predictive model by determining the value of dependent variables based on independent variables. In this example, the dependent variable is the overall error from Eq. (5) and the independent values are the production factors ($CF_{Group\text{-}1}$, $CF_{Group\text{-}2}$, ... $CF_{Group\text{-}n}$). The computer system 252 trains the predictive model for either all time data points available or a subset of all time data points available (for example, depending on user preference). For example, if the computer system 252 has access to historical data representing measurements of the gas operation network 100 over the span of 10 days, then the computer system 252 can use all of (or part of) this historical data to calibrate the production factors. This historical aspect is further explained with reference to FIG. 7. Once the production factors are determined, the model is considered "trained" and can be used to reduce the overall $CO_2$ production level of a gas operation network, as described in further detail with reference to FIG. 8.

Figure 6:
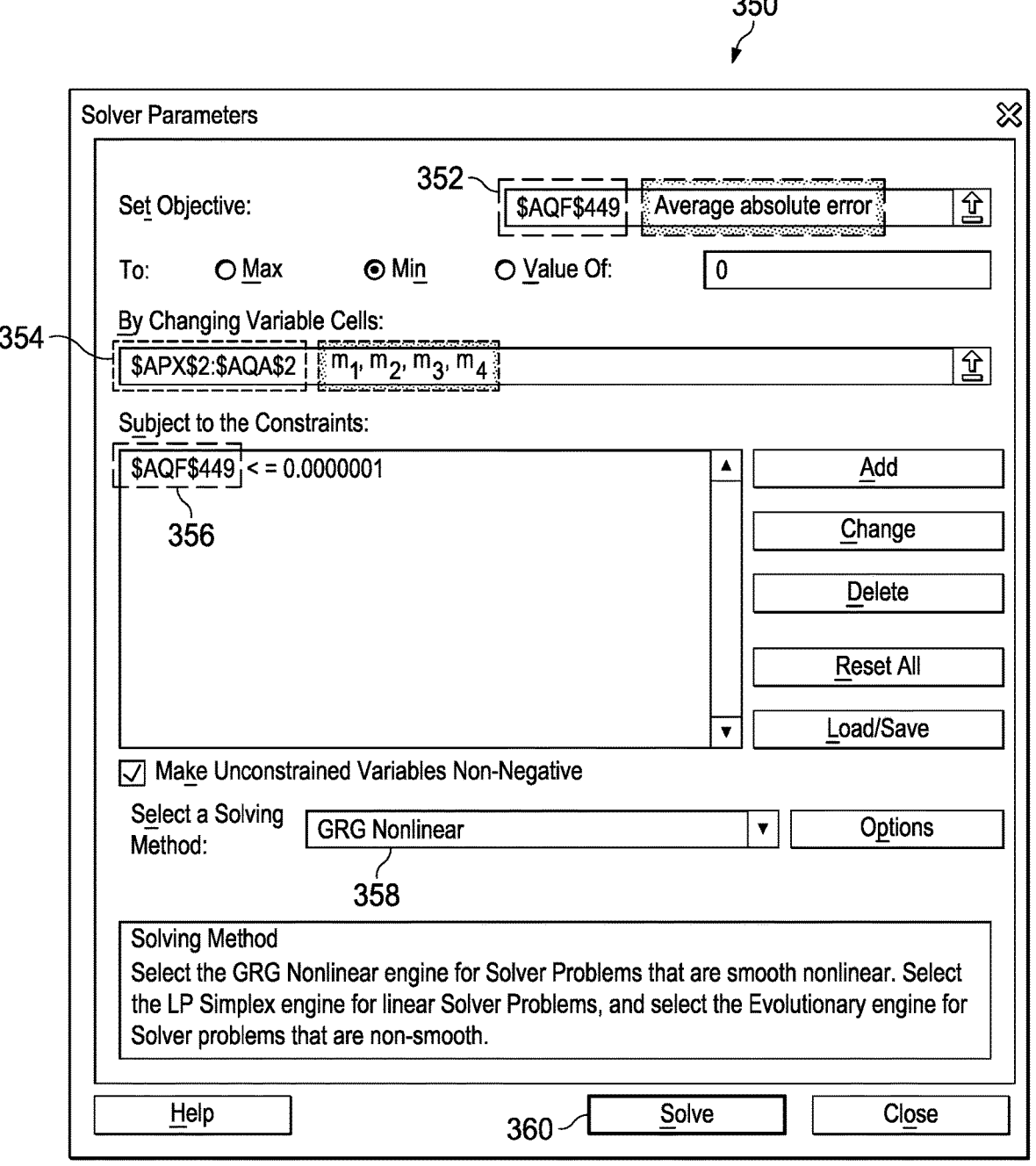
FIG. 6 is a screenshot of example solver settings used in the training of the predictive model.

FIG. 6 is a screenshot 350 of example solver settings used in the training of the predictive model. For this particular example, the computer system 252 trains the predictive modeling using Microsoft Excel and the screenshot 350 illustrates one or more solver conditions that the computer system 252 obeys while training the predictive model. For example, the user defines an average absolute error in input box 352. This error is used by the solver to determine whether the production factors have been determined to an acceptable error level. In this example, the error links back to an Excel cell with a specific error level. In some examples, the error (for example, the average absolute error) in box 352 is determined by comparing the calculated or predicted CO2 value to the measured $CO_2$ value. The user defines the dependent variables in input box 354. The computer system 252 determines these independent variables while training the predictive model. In this example, the particular variables are links back to Excel cells. The user defines additional constraints for the solver in the constraint box 356. In some examples, the constraint represents the set of the lowest value of the average absolute error as the target or objective of the calculation or iteration process. In this example, the constraint is 0.0000001, but other constraints can also be used. The computer system 252 obeys these constraints while training the predictive model. The user defines a specific solver to be used when training the predictive model in the solver box 358. In this example, the user selects the generalized reduced gradient numerical solver in solver box 358. In turn, the computer system 252 uses the selected solver in box 358 to train the predictive model when the user presses the solve button 360.

Figure 7:
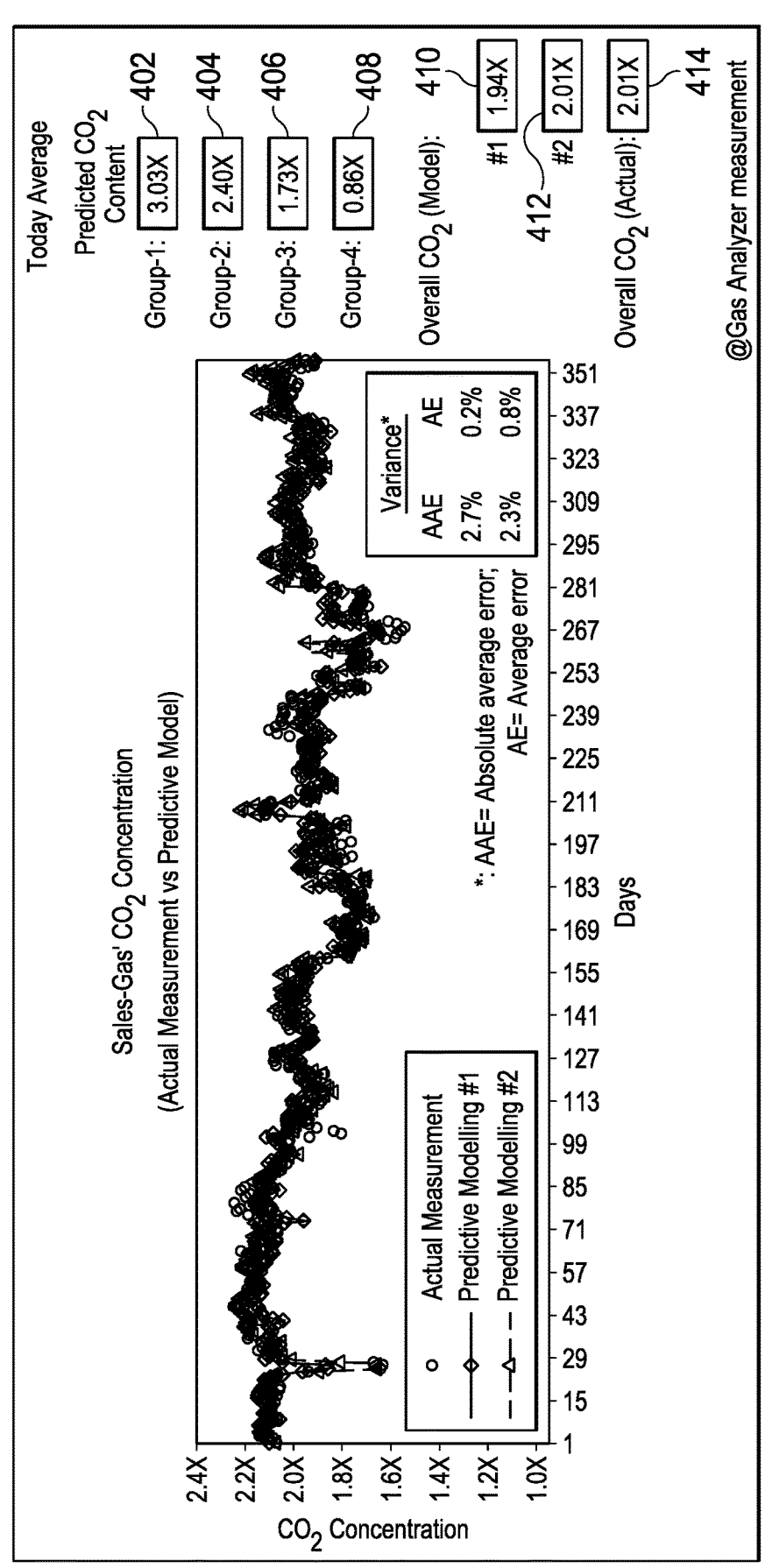
FIG. 7 is a data plot of training results of the predictive model.

FIG. 7 is a data plot 400 of training results of the predictive model. In this example plot, the predictive model was trained twice, once with the generalized reduced gradient numerical solver (shown as predictive modeling #1), and once with the multiple linear regression numerical solver (shown as predictive modeling #2). The results of each are compared with the historical data of the gas operation network. As shown in the data plot 400, the results are similar, but different. In this example, the historical data used for the training of the predictive model spans 220 days (day 1 to day 221) and the remainder of the historical data (day 222 to day 351) is not used for the training. This allows the predictive model to be tested against some additional historical data to determine whether the predictive model does an adequate job of predicting the behavior of the $CO_2$ content of the network.

In some implementations, historical data is gathered (either at the flow meter or at the processor of the computer system 242) which represents gas flow rate measurements that have occurred in the past. In some examples, the gas flowrate data, the CO2 concentration data, and/or the whole network CO2 production data is historical data. In some examples, the historical data is gathered at the respective devices and then transmitted to the computer system 252. In other examples, the historical data is stored in one or more databases of the computer system 252. In some examples, the computer system 252 appends the data to generate the historical information.

In some implementations, the computer system 252 trains the predictive model using the generalized reduced gradient numerical solver and also trains the predictive model using the multiple linear regression numerical solver. In some examples, the training using the different solvers is performed in parallel by the computer system 252. As shown in plot 400, the generalized reduced gradient numerical solver can predict the gas concentration of the gas operation network with a 2.8% average absolute error (AAE) and a 0.2% average error (AE). The multiple linear regression numerical solver can predict the gas concentration of the gas operation network with a 2.3% average absolute error (AAE) and a 0.8% average error (AE).

In some implementations, computer system 252 determines the predicted $CO_2$ content from each group of the gas operation network. As shown in FIG. 3, the gas operation network includes four groups (202A-202D). In some implementations, the computer system 252 determines the predicted $CO_2$ content from each group by evaluating Eqs. (7)-(10).

Predicted $CO_2$ Content from Group-1:

$$[CF_{Group\text{-}1} \times \Sigma(Qg \times CO_2)_{Group\text{-}1}]/\Sigma(Qg)_{Group\text{-}1} \quad \text{Eq. (7)}$$

Predicted $CO_2$ Content from Group-2:

$$[CF_{Group\text{-}2} \times \Sigma(Qg \times CO_2)_{Group\text{-}2}]/\Sigma(Qg)_{Group\text{-}2} \quad \text{Eq. (8)}$$

Predicted $CO_2$ Content from Group-3:

$$[CF_{Group\text{-}3} \times \Sigma(Qg \times CO_2)_{Group\text{-}3}]/\Sigma(Qg)_{Group\text{-}3} \quad \text{Eq. (9)}$$

Predicted $CO_2$ Content from Group-4:

$$[CF_{Group-4} \times \Sigma(Qg \times CO_2)_{Group-4}]/\Sigma(Qg)_{Group-4} \qquad \text{Eq. (10)}$$

In some implementations, the computer system 252 plots the predicted $CO_2$ content from each group of the gas operation network on a display for a user. For example, the data plot 400 includes ratios of the predicted $CO_2$ content from each group. Boxes 402, 404, 406, and 408 show the predicted $CO_2$ content from groups 1, 2, 3, and 4, respectively. In the example shown, the ratios are relative to a baseline level which is arbitrarily defined by the user. In this example, the baseline level is 1.96× (shown in box 414). This means that predicted $CO_2$ content levels above 1.96× represent an increase of $CO_2$ content and predicted $CO_2$ content levels below 1.96× represent a decrease of $CO_2$ content. Notably, the data plot 400 shows that group 1 (box 402) is contributing the most to the $CO_2$ content of the network (for example, 3.03× compared to the next highest level of 2.40× of group 2 shown in box 404) and that group 4 (box 408) is contributing the least to the $CO_2$ content of the network (for example, 0.86× compared to the next highest level of 1.73× of group 3 shown in box 406). Similarly, the total predicted $CO_2$ levels predicted by the trained model using the generalized reduced gradient numerical solver is 1.94× (box 410) and the total predicted $CO_2$ levels predicted by the trained model using the multiple linear regression numerical solver is 2.01× (box 412).

Figure 8:
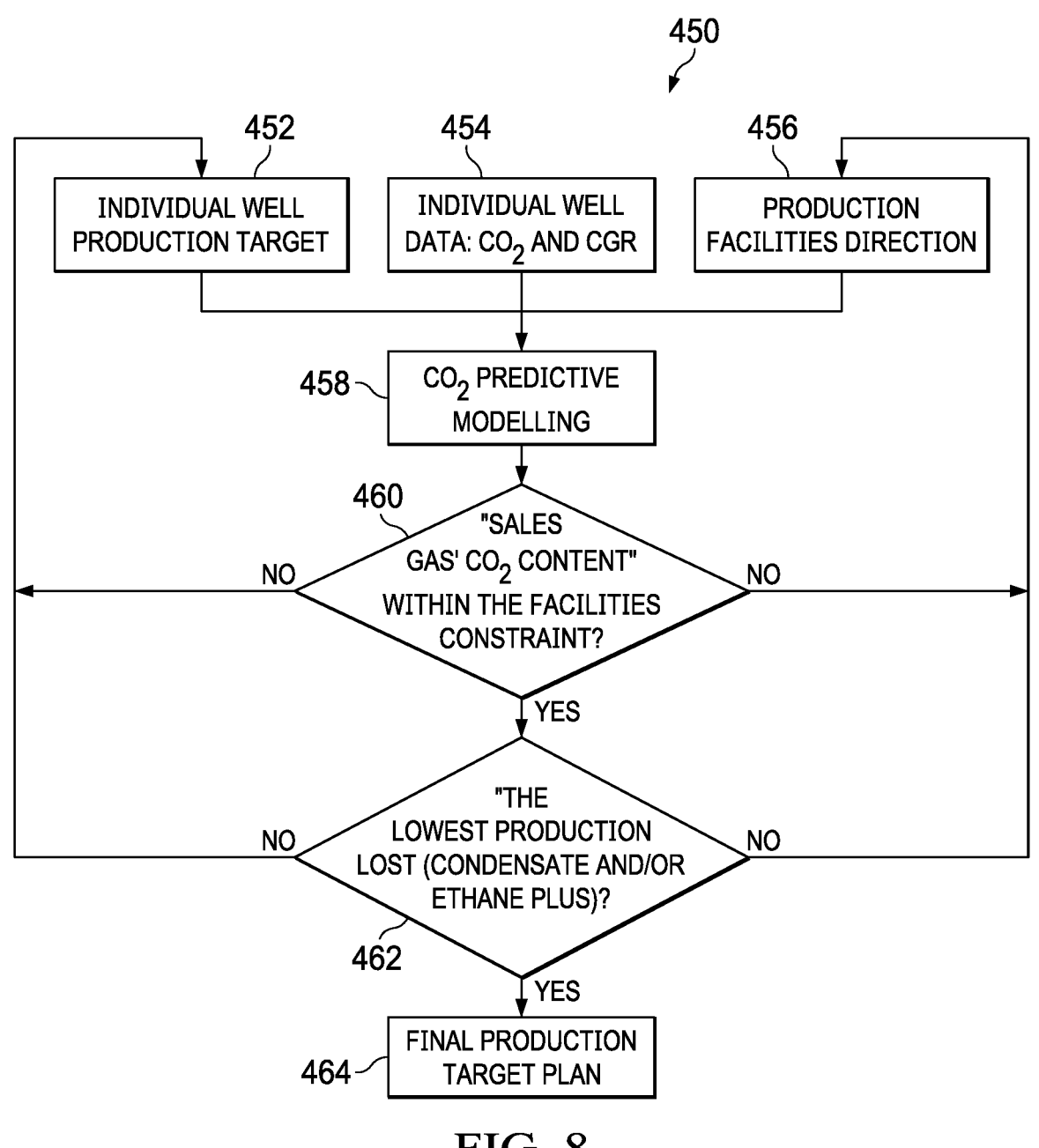
FIG. 8 is a method of using the predictive model to reduce the overall $CO_2$ production level, condensate levels, and/or ethane-plus levels of the gas operation network.

FIG. 8 is a method 450 of using the predictive model to reduce the overall $CO_2$ production level of the gas operation network. At block 452, the computer system 252 receives individual well production target values. The individual well production target values represent a production constraint for each well indicating that the production of concentrate from the well is required to be at least the value represented by the well production target value for each respective well. In some implementations, the well production target values include a minimum condensate production level of the gas operation network.

At block 454, the computer system 252 receives individual well data. The individual well data represents present (for example, real-time) measurements of the flow meters 132 and the most recent measurements of the $CO_2$ levels of the well based on the gas sampling analysis from the separator test (for example, from the $CO_2$ concentration measurement device 142). Also at block 454, the computer system 252 receives condensate-gas-ratio (CGR) values for each well. In some examples, one or more separator tests located at each well measure, determine, and/or predict the condensate-gas-ratio for each well and transmit the condensate-gas-ratio to the computer system 252.

At block 456, the computer system 252 receives production facilities direction. For example, the computer system 252 receives a maximum $CO_2$ production level of the gas operation network.

At block 458, the computer system 252 executes the predictive model to predict a whole network $CO_2$ production target for the gas operation network. For example, the computer system 252 predicts, using the trained predictive model, the whole network $CO_2$ production level based on a gas flowrate variation for at least one well of the one or more wells. For example, the computer system 252 predicts whether a 50% gas flowrate variation for a particular group changes the whole network $CO_2$ production target for the gas operation network. The computer system 252 predicts a range of potential solutions based on varying the flow rates at individual wells and/or the flow rates at particular gas gathering manifolds. The computer system 252 analyzes the resulting predictions and automatically selects a recommended gas flowrate variation strategy for each well and/or each gas gathering manifold of the entire gas operation network. These steps are expanded on in the following paragraphs.

In some implementations, the computer system 252 predicts, using the trained predictive model, a plurality of whole network $CO_2$ production levels based on a gas flowrate variation for at least one well of the one or more wells and/or the gas flow rates at the one or more gas manifolds. In this way, the computer system 252 predicts different whole network $CO_2$ production levels for different scenarios of gas flowrate variations and/or other constraints (for example, whether or not a swing remote header (for example a swing remote header 204) is used).

In some implementations, predicting the whole network $CO_2$ production target of the gas operation network includes satisfying one or more production conditions. In some examples, the one or more production conditions include a maximum $CO_2$ production level of the gas operation network and a minimum condensate production level of the gas operation network. For example, predicting the whole network $CO_2$ production target of the gas operation network includes ensuring that the predicted $CO_2$ production level is within a maximum $CO_2$ production level and that the predicted condensate production level is within a minimum condensate production level. The process of satisfying one or more production conditions is further described with reference to blocks 460 and 462.

At block 460, the computer system 252 verifies that the $CO_2$ production limits are satisfied by the whole network $CO_2$ production target of block 458. If not, the method 450 is restarted and the computer system 252 executes the predictive model again to determine another whole network $CO_2$ production target for the gas operation network. Once the condition at block 460 is satisfied, the method 450 proceeds to block 462.

At block 462, the computer system 252 verifies that the lowest production lost (for example, condensate and/or ethane plus) are satisfied by the whole network $CO_2$ production target of block 458. If not, the method 450 is restarted and the computer system 252 executes the predictive model again to determine another whole network $CO_2$ production target for the gas operation network. Once the condition at block 462 is satisfied, the method 450 proceeds to block 464 and defines the whole network $CO_2$ production target to be implemented by the network as the whole network $CO_2$ production target determined in block 458.

Table 1 shows prediction results for seven different constraint scenarios. Each scenario yields a particular total gas production target, a particular total condensate production, a particular ethane-plus production, and a specific $CO_2$ production level. In some implementations, the computer system 252 predicts the condensate production of the wells by multiplying the gas rate with the CGR value. In some implementations, the computer system 252 predicts the ethane-plus production by multiplying the gas rate with the ethane-plus factor from each gas well. In some examples, a gas composition analysis is performed and the ethane-plus factor (also referred to as the ethane-plus percentage) is determined from the gas composition analysis.

TABLE 1

| | | Predicted | | Preferable |
|---|---|---|---|---|
| Scenario | Production Strategy | $CO_2$ Value | CPI* | Scenario |
| 1. | Base case (production plan as per original target) | 2.19X | N/A | — |
| 2. | Reducing Group-1's gas production by 25% | 2.08X | −8% | No |
| 3. | Reducing Group-1's gas production by 50% | 2.00X | −15% | No |
| 4. | Increasing Group-4's gas production by 25% | 2.08X | +2% | No |
| 5. | Increasing Group-4's gas production by 50% | 2.00X | +5% | $2^{nd}$ |
| 6. | Diverting ≥66% of Swing Line Production | 1.90X | N/A | $1^{st}$ |
| 7. | Reducing Group-1's gas production by 25% AND Increasing Group-4's gas production by 25% | 2.01X | −5% | $3^{rd}$ |

*CPI = Condensate production impact; pre-determined threshold of $CO_2$ = 2.00X.

In some implementations, the computer system 252 selects the whole network $CO_2$ production target based on the overall $CO_2$ production differences. For example, the computer system 252 selects one of the plurality of scenarios based on results where the sales-gas $CO_2$ content does not exceed the $CO_2$ threshold. In some examples, the computer system 252 selects one of the plurality of scenarios based on the scenario having the minimum amount of sales-gas $CO_2$ content.

In some implementations, the computer system 252 selects the whole network $CO_2$ production target based on the overall $CO_2$ production differences and at least one of a minimum condensate production threshold. For example, the computer system 252 predicts a condensate production level for the gas operation network for each of the plurality of whole network $CO_2$ production levels by multiplying each predicted gas flowrate of the gas flowrate variation with a condensate-gas-ratio for each well. The computer system 252 determines a plurality of overall condensate production differences between each of the condensate production levels and a baseline condensate production level. In turn, the computer system 252 selects the whole network $CO_2$ production target based on the overall $CO_2$ production differences and the overall condensate production differences.

In some implementations, the computer system 252 selects the whole network $CO_2$ production target based on the overall $CO_2$ production differences, a minimum condensate production threshold, and a minimum ethane-plus production threshold. For example, the computer system predicts the ethane-plus production by multiplying the gas rate with the ethane-plus factor from each gas well.

Referring back to Table 1, the computer system 252 determines that scenario six is the recommended flow rate variation strategy because the computer system 252 determines that scenario six is associated with the maximum decrease of overall $CO_2$ content of the gas operation network (for example, 1.90× compared to the baseline of 2.19×) and no change to the concentrate production level. The computer system 252 determines that scenario five is the second most-recommended flow rate variation strategy because the computer system 252 determines that scenario five is associated with a decrease of overall $CO_2$ content of the gas operation network (2.00× compared to 2.19×) and a positive change in the concentrate production level (+5%).

In some implementations, the computer system 252 ranks the results to determine the recommended flow rate strategy. In other implementations, the computer system 252 presents the results of each scenario on a user interface and a user manually selects (for example, using an input device to the computer) a particular strategy for execution.

FIG. 9 is a method 500 for reducing $CO_2$ levels of a gas operation network using a predictive model. The gas operation network includes a plurality of wells. For example, the computer system 252, and in particular a processor of the computer system 252, performs one or more steps of the method 500 to reduce the overall $CO_2$ production level of the gas operations networks 100, 200. In some examples, one or more steps of the method 500 are performed by the valves 130, the flow meters 132, the flow meters 134, and/or the $CO_2$ meter 136. In some examples, an engineer performs one of more steps of the method 500.

At step 502, the computer system 252 processes an input dataset comprising (i) gas flowrate data for each of the plurality of wells and (ii) CO2 concentration data for each of the plurality of wells. For example, the gas flow meters 132 located at each well 102 measure gas flowrates of mixtures flowing out of the well. The gas flow meters 132 transmit the measured gas flowrates to the computer system 252 using a network (for example, a cellular network, a satellite network, or a fiber-optic network). In turn, the computer system 252 receives gas flowrate data for each of the plurality of wells. As another example, the $CO_2$ concentration measurement device 142 determines $CO_2$ concentration data based on an initial flow back measurement. As noted above, in some cases, results from a separator test gas sample analysis at the wells 102 generate the $CO_2$ concentration data. The CO2 concentration measurement device 142 transmits the $CO_2$ concentration data to the computer system 252. In turn, the computer system 252 receives $CO_2$ concentration data for each of the plurality of wells.

At step 504, the computer system 252 generates the predictive model by processing the input dataset in response to applying a reduced gradient algorithm or a linear regression algorithm to data values of the input dataset. For example, the computer system 252 generates the predictive model using the approach described with reference to blocks 324, 326, and 328 of the method 300 of FIG. 5.

At step 506, the computer system 252 predicts, by the predictive model, a CO2 production target for the gas operation network based on a gas flowrate predicted for each of the plurality of wells by the predictive model. For example, the computer system 252 predicts the whole network $CO_2$ production target using the predictive model as described with reference to blocks 458, 460, and 462 of the method 450 of FIG. 8.

At step 508, the computer system 252 generates one or more control signals to control a respective valve at each of the plurality of wells based on the CO2 production target and the predicted gas flowrate for each of the plurality of wells. For example, the one or more well control signals include signals to decrease and/or increase the flow rate based on the predicted gas flowrate for each well.

At step 510, the computer system 252 regulates CO2 levels of the gas operation network based on the CO2 production target by controlling the respective valves at each of the plurality of wells using the one or more control signals. For example, the valves 130 electrically control a flow restrictor to decrease and/or increase the flow rate of each well 102 based on the one or more well control signals. In some examples, the computer system 252 transmits the control signals to the valves 130 at each well 102.

In some implementations, instead of the steps described with reference to blocks 508 and 510, the computer system 252 determines one or more well control settings based on the predicted gas flowrate for each well and displays the control settings on a user interface in a control room located within the gas operation network. The control room includes computers with remote connections to the valves 130 for each of the wells 102. This remote connection allows a user to remotely control all of the valves 130 of the gas operation network based on the one or more control settings. For example, the computer system 252 presents the one or more control settings on a user interface, and responsive to this presentation, the user remote controls the particular valves 130 based on the control settings to achieve the desired flow rates.

In some implementations, instead of the steps described with reference to blocks 508 and 510, the computer system 252 determines one or more well control settings based on the predicted gas flowrate for each well, transmits the one or more well control signals to a computer located at the well 102, and displays the one or more well control settings on a display of the computer for a user to view the control settings. In turn, the user controls the valves 130 (for example, by manually rotating the valves 130) to achieve the flow rate represented by the well control settings.

Figure 10:
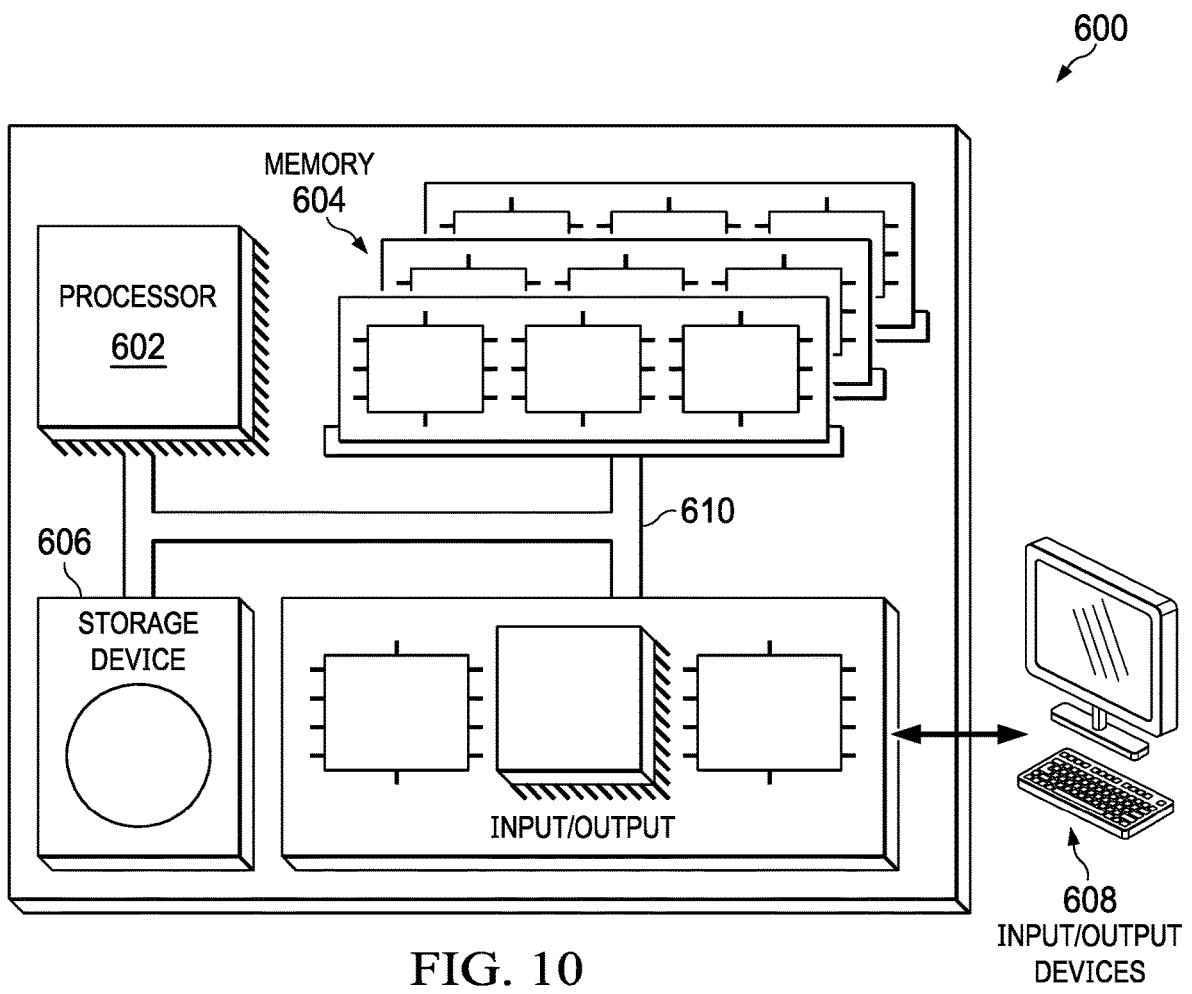
FIG. 10 is a schematic illustration of an example computer of the gas operation network.

FIG. 10 is a schematic illustration of an example computer 600 of the gas operation network. For example, the computer 600 includes the computer system 252 for reducing the overall $CO_2$ production level of a gas operation network using a predictive model. In some implementations, each of the valves 130, the CO2 concentration measurement device 142, flow meters 132, flow meters 134, the $CO_2$ meter 136 include one or more components of the computer 600.

The computer 600 is intended to include various forms of digital computers, such as printed circuit boards (PCB), processors, digital circuitry, or otherwise parts of a system for determining a subterranean formation breakdown pressure. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The computer 600 includes a processor 602, a memory 604, a storage device 606, and an input/output device 608 (for displays, input devices, example, sensors, valves, pumps). Each of the components 602, 604, 606, and 608 are interconnected using a system bus 610. The processor 602 is capable of processing instructions for execution within the computer 600. The processor may be designed using any of a number of architectures. For example, the processor 602 may be a CISC (Complex Instruction Set Computers) processor, a RISC (Reduced Instruction Set Computer) processor, or a MISC (Minimal Instruction Set Computer) processor.

In one implementation, the processor 602 is a single-threaded processor. In another implementation, the processor 602 is a multi-threaded processor. The processor 602 is capable of processing instructions stored in the memory 604 or on the storage device 606 to display graphical information for a user interface on the input/output device 608.

The memory 604 stores information within the computer 600. In one implementation, the memory 604 is a computer-readable medium. In one implementation, the memory 604 is a volatile memory unit. In another implementation, the memory 604 is a non-volatile memory unit.

The storage device 606 is capable of providing mass storage for the computer 600. In one implementation, the storage device 606 is a computer-readable medium. In various different implementations, the storage device 606 may be a floppy disk device, a hard disk device, an optical disk device, or a tape device.

The input/output device 608 provides input/output operations for the computer 600. In one implementation, the input/output device 608 includes a keyboard and/or pointing device. In another implementation, the input/output device 608 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A method for reducing $CO_2$ levels of a gas operation network using a predictive model, the gas operation network comprising a plurality of wells, the method comprising:
   processing an input data set comprising (i) gas flowrate data for each of the plurality of wells and (ii) $CO_2$ concentration data for each of the plurality of wells;
   generating the predictive model by processing the input dataset in response to applying a reduced gradient algorithm or a linear regression algorithm to data values of the input dataset;
   predicting, by the predictive model, a $CO_2$ production target for the gas operation network based on a gas flowrate predicted for each of the plurality of wells by the predictive model;
   generating one or more control signals to control a respective valve at each of the plurality of wells based on the $CO_2$ production target and the predicted gas flowrate for each of the plurality of wells; and
   regulating $CO_2$ levels of the gas operation network based on the $CO_2$ production target by controlling the respective valves at each of the plurality of wells using the one or more control signals.

2. The method of claim 1, wherein:
   the input data set comprises historical data from a previous time period; and
   the predictive model is generated based on a training phase that coincides with the previous time period or overlaps the previous time period.

3. The method of claim 2, wherein the previous time period spans at least 100 days.

4. The method of claim 1, further comprising:
   providing a threshold $CO_2$ level for the plurality of wells that is based on (i) the gas flowrate data for each of the plurality of wells and (ii) the $CO_2$ concentration data for each of the plurality of wells.

5. The method of claim 4, wherein the predictive model is based on the threshold $CO_2$ level for each of the plurality of wells and a corresponding production factor.

6. The method of claim 1, wherein the gas operation network comprises a plurality of gas gathering manifolds and a plurality of slug catchers.

7. The method of claim 6, wherein generating the predictive model comprises:
   determining a total gas production of each of the plurality of gas gathering manifolds based on historical gas flowrate data for each of the plurality of wells connected to a corresponding gas gathering manifold;
   comparing the total gas production of each of the plurality of gas gathering manifolds to a gas flowrate measured at each of the plurality of slug catchers; and
   updating the predictive model based on the comparison.

8. The method of claim 1, wherein generating the predictive model comprises:
   minimizing a difference between (i) $CO_2$ production predictions for the gas operation network and (ii) $CO_2$ production data for the gas operation network.

9. The method of claim 8, further comprising:
   measuring, by one or more gas flow meters located at each of the plurality of wells, the gas flowrate data;
   measuring, by one or more separator tests located at each of the plurality of wells, the $CO_2$ concentration data; and
   measuring, by a $CO_2$ meter located at a gas processing plant or downstream of the gas processing plant, the $CO_2$ production data.

10. The method of claim 1, wherein generating the predictive model comprises solving a minimization problem using at least one of a generalized reduced gradient solver and a multiple linear regression solver.

11. The method of claim 1, wherein predicting the $CO_2$ production target of the gas operation network comprises satisfying one or more production conditions.

12. The method of claim 11, wherein the one or more production conditions comprise a maximum $CO_2$ production level of the gas operation network.

13. The method of claim 12, wherein the one or more production conditions comprise a minimum condensate production level of the gas operation network.

14. The method of claim 1, wherein predicting the $CO_2$ production target for the gas operation network comprises:

predicting a plurality of $CO_2$ production levels based on a gas flowrate variation for at least one well of the plurality of wells;

determining a plurality of $CO_2$ production differences between each of the plurality of $CO_2$ production levels and a baseline $CO_2$ production level; and selecting the $CO_2$ production target based on the plurality of $CO_2$ production differences.

15. The method of claim 14, wherein the gas flowrate variation represents a variation between a reduction in gas production of the at least one well of the plurality of wells by 50% and an increase in gas production of the at least one well of the plurality of wells by 50%.

16. The method of claim 14, wherein selecting the $CO_2$ production target comprises:

predicting a condensate production level for the gas operation network for each of the plurality of $CO_2$ production levels by multiplying each predicted gas flowrate of the gas flowrate variation with a condensate-gas-ratio for each of the plurality of wells;

determining a plurality of condensate production differences between each of the condensate production levels and a baseline condensate production level; and selecting the whole network $CO_2$ production target based on the plurality of $CO_2$ production differences and the plurality of condensate production differences.

17. The method of claim 16, further comprising measuring, by one or more separator tests located at each well of the plurality of wells, the condensate-gas-ratio for each of the plurality of wells.

18. A system for reducing $CO_2$ levels of a gas operation network using a predictive model, the gas operation network comprising a plurality of wells, the system comprising:

a plurality of gas flow meters operable to measure a gas flowrate of a gas at each of the plurality of wells;

a $CO_2$ concentration measurement device operable to measure a $CO_2$ concentration of the gas at the plurality of wells;

a $CO_2$ meter operable to measure a network $CO_2$ production level of the gas, wherein the $CO_2$ meter is located at a gas processing plant of the gas operation network or downstream of the gas processing plant;

a plurality of valves operable to control a flow of the gas at the plurality of wells;

a computer storing instructions that, when executed by a processor of the computer, cause the processor to perform operations comprising:

processing an input data set comprising (i) the measured gas flowrate for each of the plurality of wells and (ii) the measured $CO_2$ concentration for each of the plurality of wells;

generating the predictive model by processing the input dataset in response to applying a reduced gradient algorithm or a linear regression algorithm to data values of the input dataset;

predicting, by the predictive model, a $CO_2$ production target for the gas operation network based on a gas flowrate predicted for each of the plurality of wells by the predictive model;

generating one or more control signals to control each of the plurality of valves at each of the plurality of wells based on the $CO_2$ production target and the predicted gas flowrate for each of the plurality of wells; and regulating $CO_2$ levels of the gas operation network based on the $CO_2$ production target by controlling each of the plurality of valves at each of the plurality of wells using the one or more control signals.

19. The system of claim 18, wherein the gas operation network comprises a plurality of gas gathering manifolds.

20. The system of claim 19, wherein the gas operation network comprises a plurality of slug catchers.

* * * * *